Feb. 27, 1968

G. L. WALLIS 3,370,760

DISTRIBUTING APPARATUS

Filed Nov. 15, 1965

INVENTOR
GEORGE L. WALLIS

BY Wenderoth, Lind and Ponack

ATTORNEY

Feb. 27, 1968    G. L. WALLIS    3,370,760
DISTRIBUTING APPARATUS
Filed Nov. 15, 1965    3 Sheets-Sheet 2

INVENTOR
GEORGE L. WALLIS

BY Wenderoth, Lind and Ponack
ATTORNEYS

Feb. 27, 1968   G. L. WALLIS   3,370,760
DISTRIBUTING APPARATUS
Filed Nov. 15, 1965   3 Sheets-Sheet 3

INVENTOR
GEORGE LESLIE WALLIS
BY Wenderoth, Lind & Ponack
ATTORNEYS

United States Patent Office 3,370,760
Patented Feb. 27, 1968

3,370,760
DISTRIBUTING APPARATUS
George Leslie Wallis, Quillot End, The Quillot, Burwood Park, Walton-on-Thames, Surrey, England
Filed Nov. 15, 1965, Ser. No. 507,775
2 Claims. (Cl. 222—312)

ABSTRACT OF THE DISCLOSURE

Distributing apparatus for powdered or granular material comprising a hopper having at its lower end an elongated opening closed by a rotatable roller having a soft resilient surface, in which part of said roller coacts with a fixed smoothing member forming part of said elongated opening to control the flow of material therebetween, the rotational axis of said roller being pivotable about an axis parallel to said rotational axis so that the gap between the surface of the roller and the smoothing member may be continuously varied as desired to control the flow of material from the apparatus.

---

This invention is concerned with improvements in or relating to devices for distributing powdered or granular material such as powdered or granular fertilizer. More particularly the invention is concerned with such devices which comprise a hopper, the lower end of which has an elongated opening closed by a rotatable roller, upon which roller the material to be distributed settles and by which roller material is carried round and is finally discharged. The rotatable roller in such devices is generally driven by ground wheels supporting the device; e.g. the axle of a pair of ground wheels forms the axis of the roller.

It is an object of the present invention to provide a distributing device having improved simple means for control of the rate of discharge of the material.

According to the invention there is provided distributing apparatus for powdered or granular material comprising a hopper having at its lower end an elongated opening closed by a rotatable distributing roller having a soft resilient surface in which part, preferably the upper forward part, of said roller coacts with a fixed smoothing member forming part of said elongated opening to control the flow of material therebetween, the rotational axis of said roller being pivotable about an axis parallel to said rotational axis so that the gap between the surface of the roller and the smoothing member may be varied as desired to control the flow of material.

The surface of the roller is preferably of a cellular material such as foamed rubber or a foamed expanded synthetic plastomer or elastomer such as foamed polyurethane or foamed polyethylene. The smoothing member with which the roller coacts to control the flow of material is preferably shaped to conform to the surface of the roller, i.e. is of arcuate shape. The axis about which the axis of the roller pivots is preferably substantially in the same horizontal plane as the axis of the roller when the apparatus is in the operational position and will generally be rearward thereof when the roller rotates in the same direction as ground wheels supporting the apparatus. The roller axle may, as described above, be the axle of ground wheels supporting the vehicle, or the roller may be driven by the ground wheels by means of a clutch mechanism.

In order that the invention may be well understood several embodiments thereof will now be described with reference to the accompanying drawings.

Figure 1:
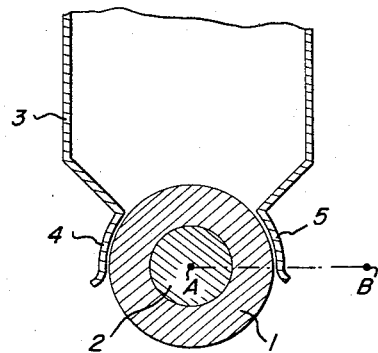
Figure 2:
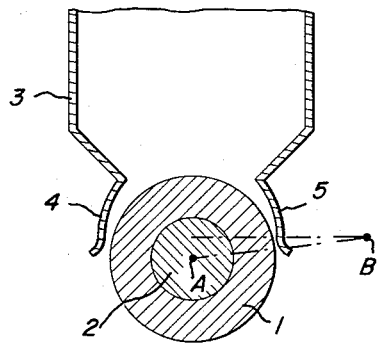
Figure 3:
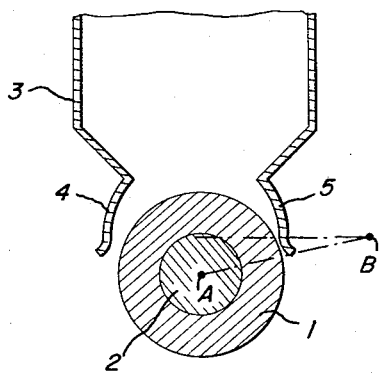
Figure 4:
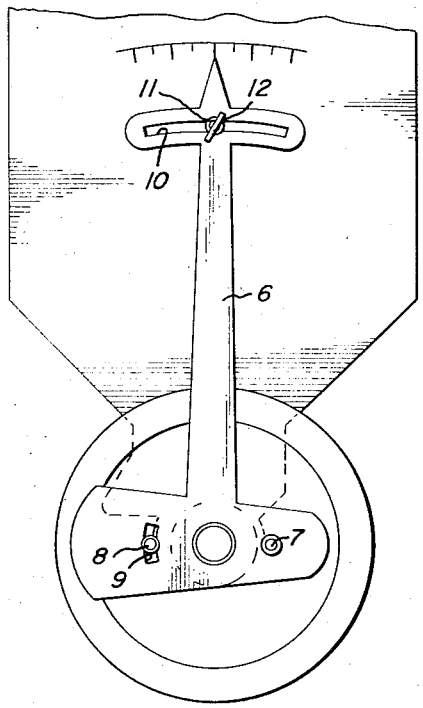
Figure 5:
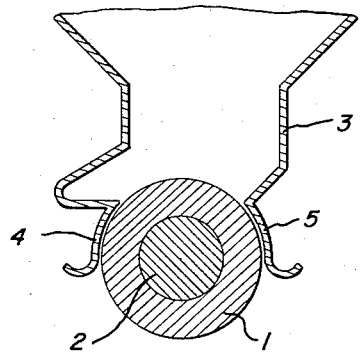
Figure 6:
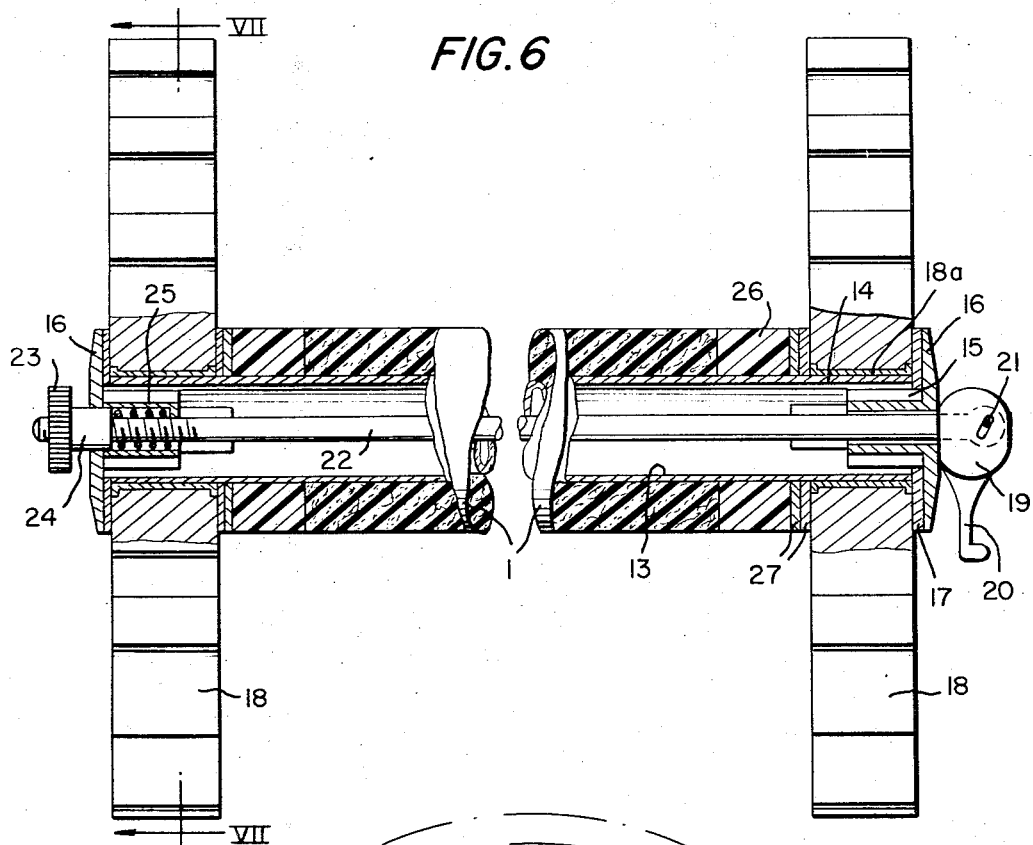
Figure 7:
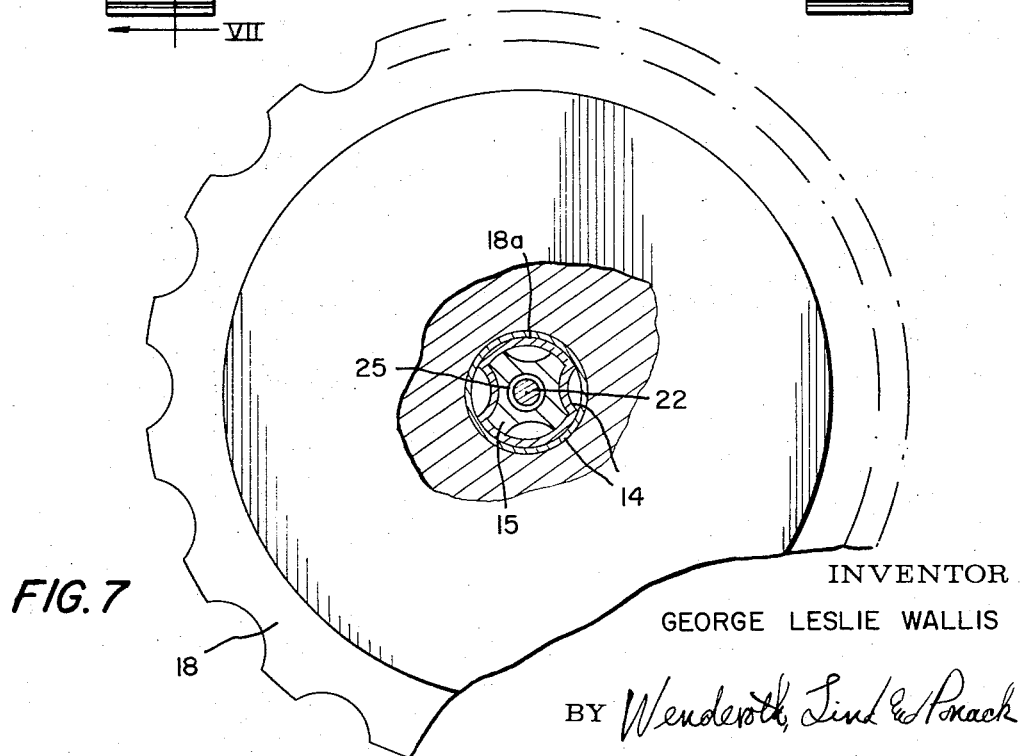

FIGURES 1, 2 and 3 are sections through a simple device according to the invention, FIGURE 4 is an end view of a device according to the invention showing a preferred method of controlling the position of the roller and FIGURE 5 shows a preferred form of the lower part of the hopper, FIGURES 6 and 7 are longitudinal and end views partly in section, of ground wheels and associated parts.

Referring now to FIGURES 1, 2 and 3 a distributing device comprises a roller 1 of cellular material mounted on a shaft 2 which may be rotated by means, for example, ground wheels 18 (only one of which is shown) supporting the device, in the direction shown. Roller 1 is mounted in an elongated opening at the lower end of a hopper 3 and co-operates with lower wall 4 which serves as a smoothing member to control the flow of material from hopper 3, lower wall 5 co-operates with roller 1 to close the opposite side of the opening. Lower wall 5 may advantageously be sprung so as to maintain close contact with the surface of roller 1.

Roller 1 is provided with means, not shown, to pivot the axis thereof A about axis B. In general the means for pivoting the axis of roller 1 about axis B will take the form of one or more levers pivoting about axes coincidental with axis B, having bearing means for rotatably supporting shaft 2 and also having means for securing the said lever or levers in a desired fixed position.

Referring now to FIGURE 1 the device is shown closed. Because of the resilient nature of roller 1 rotation of the roller would cause some material to be carired round between the roller and wall 4; however, in this case the amount of material transferred would not be great.

Referring now to FIGURE 2, the apparatus is shown with axis A partially pivoted about axis B so that there is an acute angled gap between wall 4 and the surface of roller 1. Under these conditions considerably more material would be discharged upon rotation of roller 1 but the rate of discharge would be considerably impeded by the narrowness of the lower end of the gap between wall 4 and the surface of roller 1.

FIGURE 3 shows the apparatus in a more fully open position with a considerable gap between wall 4 and the surface of roller 1; under which conditions the rate of flow of material would be high.

The wide range of control given by the apparatus is due to the manner in which the gap between the surface of roller 1 and side wall 4 is varied. Thus at first on opening the roller from a closed position the gap becomes an acute angled upwardly directly V-shaped gap, as shown in FIGURE 2 with the surface of roller 1 still substantially in contact with the lower part of side wall 4. On further opening, the gap becomes wider and the surface of roller 1 becomes spaced from wall 4, as shown in FIGURE 3, to provide for more rapid discharge of the material. It has been found advantageous for the distribution of material of low bulk density that there should be a definite gap between the side wall and the surface roller whereas for more dense materials the surface of the roller and the side wall may be in contact.

The rate of discharge of any given material through the apparatus according to the invention will of course depend to some extent upon the properties of the material itself, e.g. particle size and bulk density. The apparatus provides good control of the rate of discharge of widely differing materials over a wide range of rates of discharge, and the rate of discharge is substantially linear; i.e. for a given material and a fixed position of the roller, the amount of material discharged depends only upon the number of rotations of the roller and is substantially independent of the rate of rotation of the roller or the amount of material in the hopper. This property renders the apparatus particularly suitable for the application of fertilizer materials, in which application at a constant controllable delivery rate is of importance.

As shown in FIGURES 1, 2 and 3, the walls 4 and 5 are continuations of the hopper walls and may be constructed from the same material as the hopper, e.g. pressed sheet steel. Preferably wall 4, at least is constructed, where it is in contact with the surface of roller 1, of a material such as stainless steel and this may be achieved at by attaching a stainless steel liner to the wall. Walls 4 and 5 need not necessarily form a continuous part of hopper 3 but may be attached thereto and may take the form of lined plates or castings. The hopper may be designed as a conventional hopper or may be shaped so as to receive as a snug fit a carton or container in which the material to be dispensed in sold.

Referring now to FIGURE 4, the position of shaft 2 is adjusted by means of lever 6 pivoted about bolt 7 and slot 9 and having bearings containing shaft 2. In the upper part of lever 6 is slot 10 which engages on screw 11 which co-operates with wing nut 12 to clamp and hold lever 6 in any desired position. The uppermost portion of lever 6 terminates in a pointer which indicates the position of lever 6 in conjunction with a scale engraved or painted on the side wall of hopper 3. There are two such levers, one on either side of the hopper.

The actual conformation of the hopper and chamber immediately above roller 1 may be varied as desired. It has, however, been found useful for the lower part of the hopper to have configuration shown in FIGURE 5; i.e. to form a choke or constricted part giving into a lower enlarged discharge chamber, the greater part of the weight of the material in the hopper being supported by the inclined side walls leading to the choke or constriction.

In a preferred embodiment, FIGURES 6 and 7, distributing roller 1 comprises a tube 13 upon which is fitted a sleeve of aerated rubber, polyurethane or similar soft resilient material and the ends 14 of this tube 13 are fluted or made hexagonal or otherwise suitably fashioned for the reception of correspondingly shaped driving elements 15 which engage in each of the fluted ends of the tube. The outer ends of the driving elements 15 have flanges 16 provided on their inner faces with friction dics 17 which are adapted to be urged against the center parts of the outer faces of ground wheels 18 whereby the driving elements are made fast with the wheels 18 so that the drive from the latter, as the machine is being wheeled over the ground, is transmitted to the fluted ends of the tube 13 and the roller 1 so caused to rotate. Each wheel 18 is fitted with a sleeve bearing 18a in which the fluted ends 14 of the tube 13 can rotate.

The means for urging the friction discs 17 against the side faces of the ground wheels 18 comprises a cam 19 formed with a finger piece 20 and this cam 19 is eccentrically pivoted at 21 to one end of a rod 22 passing completely through the roller tube 13 and this rod 22 is screw-threaded at its other end to receive a nut 23 formed with a hollow shank 24 which enters a bore in the driving element 15 at this end of the roller and compresses therein a small spring 25. The arrangement is such that with the spring compressed a required amount the rod 22 moves slightly axially in one direction by releasing the cam 19 and the friction discs 17 can slip with respect to the faces of the ground wheels 18 so that the driving elements are "declutched" and do not drive the roller 1.

A further advantage of this drive arrangement is that the spring loading 25 provides for a "differential" action and permits the necessary slip to allow one ground wheel to turn more quickly than the other when the machine is being turned.

The ends of the roller sleeve terminate in bushings 26. The inner diameter of each of these bushings 26 is provided with diametrically opposed nibs or tongues (not visible in the drawings) which engage in the flutes in the ends of the tube 13 and, to supplement the drive through the friction discs 17, the opposed inner faces of the ground wheels 18 and the outer ends of the bushes 26 being fitted with friction discs 27.

I claim:
1. Distributing apparatus for powdered or granular material, comprising a hopper having at its lower end an elongated opening, a rotatable roller having a soft resilient surface rotatably mounted in said opening, a fixed smoothing member along one edge of said opening and having a concave surface facing said roller with substantially the same curvature as the curvature of the surface of the roller with which said roller coacts to control the gap between the surface of the roller and the smoothing surface, a second surface along the other edge of said opening and facing the roller and against which the roller rolls to seal the said elongated opening in all positions of said roller, pivoting members on which said roller is mounted and pivotally mounted on said hopper adjacent said second concave surface and pivotal around an axis on the opposite side thereof from said roller for continually varying the gap between the roller and the smoothing member and moving said roller along said second surface.

2. Distributing apparatus as claimed in claim 1 in which said hopper has a reduced cross sectional area at a point spaced above said roller, the hopper having a larger cross sectional area just above said roller than at said reduced cross sectional area, whereby the reduced cross sectional area supports most of the weight of the material in the hopper.

References Cited

UNITED STATES PATENTS

| | | | |
|---|---|---|---|
| 445,071 | 1/1891 | Olsen | 222—314 |
| 533,252 | 1/1895 | Thomas | 222—310 X |
| 1,447,722 | 3/1923 | Hendriksen | 222—317 X |
| 2,237,504 | 4/1941 | Roath | 222—314 |
| 2,680,539 | 6/1954 | Seltzer | 222—177 |
| 3,190,506 | 6/1965 | Seltzer. | |

ROBERT B. REEVES, *Primary Examiner.*

HADD S. LANE, *Examiner.*